US008838801B2

(12) United States Patent
Alapati et al.

(10) Patent No.: US 8,838,801 B2
(45) Date of Patent: *Sep. 16, 2014

(54) CLOUD OPTIMIZATION USING WORKLOAD ANALYSIS

(75) Inventors: Sangram Alapati, Austin, TX (US); Prathiba Kumar, Bangalore (IN); Gowri Palani, Bangalore (IN); Rajan Ravindran, Karnataka (IN); Satish Kumar Sadasivam, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/549,774

(22) Filed: Jul. 16, 2012

(65) Prior Publication Data

US 2013/0111035 A1 May 2, 2013

Related U.S. Application Data

(63) Continuation of application No. 13/283,683, filed on Oct. 28, 2011.

(51) Int. Cl.
*G06F 15/173* (2006.01)
(52) U.S. Cl.
USPC ............ 709/226; 709/223; 709/224; 717/130
(58) Field of Classification Search
CPC ............ H04L 12/1439; H04L 41/0806; H04L 41/5041; H04L 67/10; G06F 15/173
USPC ............................ 709/223, 224, 226; 717/130
See application file for complete search history.

(56) References Cited

U.S. PATENT DOCUMENTS

| | | | |
|---|---|---|---|
| 8,463,900 B2 * | 6/2013 | Dasgupta et al. ............. | 709/224 |
| 2007/0169001 A1 * | 7/2007 | Raghunath et al. ........... | 717/130 |
| 2008/0184244 A1 | 7/2008 | Shankar et al. | |
| 2008/0250414 A1 | 10/2008 | Brokenshire et al. | |
| 2008/0271003 A1 | 10/2008 | Minor et al. | |
| 2010/0332262 A1 | 12/2010 | Horvitz et al. | |
| 2011/0078679 A1 | 3/2011 | Bozek et al. | |
| 2011/0131589 A1 * | 6/2011 | Beaty et al. ................... | 719/318 |
| 2011/0138050 A1 | 6/2011 | Dawson et al. | |
| 2011/0302287 A1 * | 12/2011 | Muppirala et al. ............ | 709/223 |
| 2011/0314465 A1 * | 12/2011 | Smith et al. ....................... | 718/1 |
| 2012/0005345 A1 * | 1/2012 | Doyle et al. ................... | 709/226 |
| 2012/0131593 A1 * | 5/2012 | DePetro ........................ | 718/105 |
| 2013/0061220 A1 * | 3/2013 | Gnanasambandam et al. ... | 718/1 |
| 2013/0080814 A1 * | 3/2013 | Cong et al. ..................... | 713/340 |
| 2013/0124912 A1 * | 5/2013 | Griffith et al. .................. | 714/4.2 |
| 2013/0166308 A1 * | 6/2013 | Kawashima et al. .......... | 704/500 |

* cited by examiner

*Primary Examiner* — Tesfay Yohannes
(74) *Attorney, Agent, or Firm* — Garg Law Firm, PLLC; Rakesh Garg; Parashos Kalaitzis

(57) ABSTRACT

A method for cloud optimization using workload analysis is provided in the illustrative embodiments. An architecture of a workload received for execution in a cloud computing environment is identified. The cloud computing environment includes a set of cloud computing resources. A section of the workload is identified and marked for static analysis. Static analysis is performed on the section to determine a characteristic of the workload. A subset of the set of cloud computing resources is selected such that a cloud computing resource in the subset is available for allocating to the workload and has a characteristic that matches the characteristic of the workload as determined from the static analysis. The subset of cloud computing resources is suggested to a job scheduler for scheduling the workload for execution.

14 Claims, 6 Drawing Sheets

CLOUD OPTIMIZATION USING WORKLOAD ANALYSIS

RELATED APPLICATION

The present application is a CONTINUATION of co-pending and commonly assigned U.S. patent application Ser. No. 13/283,683.

TECHNICAL FIELD

The present invention relates generally to a computer implemented method for optimizing the use of computing resources. Particularly, the present invention relates to a computer implemented method for optimizing computing resource usage in a cloud computing environment using workload analysis.

BACKGROUND

Description of the Related Art

Cloud computing is one of the emerging technologies that is enabling flexible and efficient computing. Cloud computing offers an on-demand model for computing that reduces, or in some cases, completely avoids the hardware and software maintenance costs for an end user of the computing services.

Cloud computing also generally has a lower total cost of ownership as compared to captive computing capabilities, such as dedicated/owned data processing systems. The flexibility of using selected computing resources when they are needed, as a service, is a key advantage of cloud computing that endear the cloud model to all types of users, including business enterprises, high power computing groups, and individual users.

Cloud computing is generally offered in two models. Platform as a Service (PaaS) model for cloud computing provides a user with a complete setup on which to execute the user's application or workload. The PaaS model provides an integrated hardware and software architecture that appears as a "platform" on which the user's workloads can execute. The PaaS model provides a facility to execute a workload without providing the user with control over the configuration of the data processing environment.

Infrastructure as a Service (IaaS) model of cloud computing, on the other hand, provides the user with a data processing environment per the user's request. In other words, IaaS model provides to the user "machine time" on a data processing system of the user's desired configuration. Typically, the data processing environment in the IaaS model takes the form of virtual machines (VMs) created according to a user-provided specification and allocated to the user for the duration of the user's workload.

The PaaS model requires the user to specify the user's workload and then provides the user a transparently configured data processing system for the execution of that user's workload. The IaaS model provides the user the flexibility to configure a data processing system according to the user's needs and then execute any workload on that data processing system as the user may wish.

SUMMARY

The illustrative embodiments provide a method for cloud optimization using workload analysis. An embodiment identifies, using a processor and a memory, an architecture of a workload received for execution in a cloud computing environment, the cloud computing environment including a set of cloud computing resources. The embodiment identifies and marks a section of the workload for static analysis. The embodiment performs static analysis on the section to determine a characteristic of the workload. The embodiment selects a subset of the set of cloud computing resources, such that a cloud computing resource in the subset is available for allocating to the workload and has a characteristic that matches the characteristic of the workload as determined from the static analysis. The embodiment suggests the subset of cloud computing resources to a job scheduler for scheduling the workload for execution.

BRIEF DESCRIPTION OF THE SEVERAL VIEWS OF THE DRAWINGS

The novel features believed characteristic of the embodiments are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
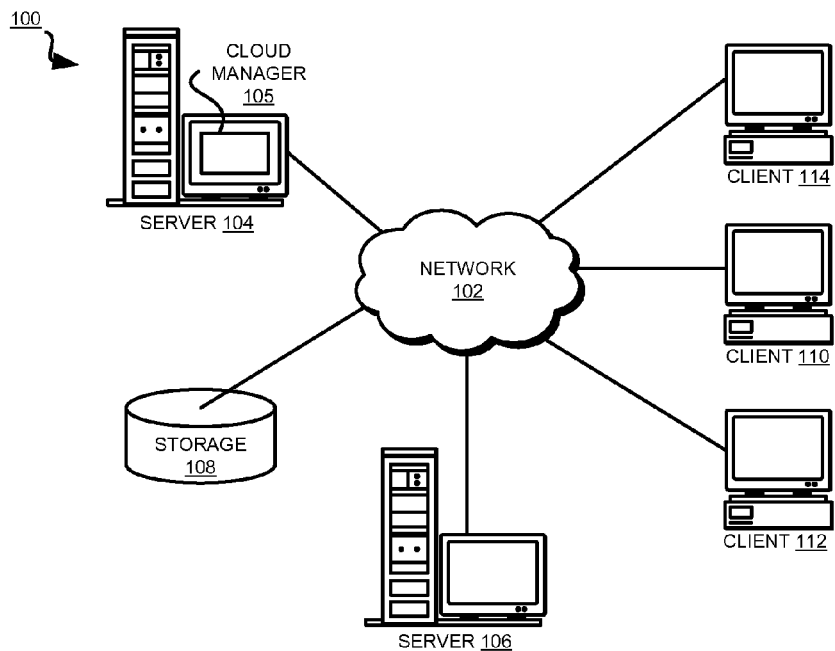
FIG. 1 depicts a pictorial representation of a network of data processing systems in which illustrative embodiments may be implemented.

A typical cloud computing environment supports a diverse group of users, having varying needs, and executing widely variable workloads. The illustrative embodiments recognize that because of such demands on a cloud computing environment, the computing resources of the cloud are often sub-optimally utilized.

The illustrative embodiments further recognize that the optimization of cloud computing resources is tricky because the performance parameters of the cloud are not as straightforward as a captive data processing system's performance parameters. For example, a cloud computing environment's performance from a user's point of view depends on how quickly the cloud provides execution of the user's workloads. The cloud's performance from the cloud provider's point of view includes at least three parameters—the ability to support a desired number of requests, satisfaction of the user's demands or service level agreements, and efficient use of resources including energy efficiency.

Currently when a user submits a workload to a PaaS vendor, the user usually either asks for the job to be completed (without specifying system requirements) or may ask for a particular system configuration (usually a high end system) without actually knowing the exact characteristics of the system needed for the workload. The illustrative embodiments recognize that this approach to consuming and delivering PaaS services has a few drawbacks.

For example, the workload may require a higher resource configuration, e.g., more resources than the system the user has asked for, in order to execute the workload in a satisfactory manner. Usually, in such a case, the workload execution progresses slower than the user's expectation leading to a dissatisfied customer.

As another example, the workload may require a lower resource configuration, e.g., fewer resources than demanded by the user, leading to wasteful over-allocation of cloud resources. As a result, in such a case, the cloud services provider's performance metrics are not met, and a more deserving workload may be starved for resources leading to a dissatisfied customer.

The ability to support a number of users on the cloud inherently means that the user workloads should be completed as quickly as possible so that the next workload can be executed. The illustrative embodiments recognize that the ability to execute a workload in the minimum amount of time is dependent on optimized placement of workloads on the cloud computing resources. The illustrative embodiments further recognize that user satisfaction typically depends on quick execution of the workloads, which is often understood to mean, incorrectly, that the more cloud computing resources made available to a workload, the faster the workload will execute to completion.

The illustrative embodiments also recognize that resource efficiency, including energy efficiency, is often achieved by a diametrically opposite consideration of utilizing as few resources as possible to complete a workload. Workload consolidation, delayed execution to reutilize a suitably configured cloud computing resource, and other such techniques contribute to improved resource efficiency but are often detrimental to user-satisfaction.

For these and other similar reasons, the illustrative embodiments recognize that cloud optimization has to be performed not only with optimal workload placement considerations but also satisfactory performance of the workloads (e.g., applications) themselves. Cloud optimization performed with such conflicting considerations can enable improved throughput for the cloud infrastructure as well as satisfactory workload performance for user-satisfaction. Any trade-offs between workload performance and workload placement should balance the conflicting objectives of resource efficiency and user-satisfaction in cloud optimization.

The illustrative embodiments used to describe the invention generally address and solve the above-described problems and other problems related to optimization of cloud computing environments. The illustrative embodiments provide a method for cloud optimization using workload analysis.

Generally, the illustrative embodiments provide effective allocation and usage of the cloud resources based on the nature of the submitted workload. An embodiment analyzes the workload—statically and dynamically to determine suitability of a cloud resource for executing that workload. Assuming a heterogeneous cloud having a mix of common types of computing resources, the workload is examined to identify suitable cloud resources for executing the workload using the workload's static characteristics.

A static characteristic of a workload is a characteristic of the workload's data, for example, the code of the workload—including but not limited to the binary code of the workload executable. Some examples of the static characteristics of a workload are the instruction set architecture (ISA) used in the workload, branching and the complexity of branch prediction in the workload's code, and distribution of load/store instructions, and other characteristics similarly discernible from the workload without executing the workload. Within the scope of the illustrative embodiments, static analysis is an analysis of one or more static characteristic of a workload.

The static analysis according to an embodiment determines the compatibility of the various cloud computing resources with a given workload. For example, static analysis of an embodiment uses the presence of a certain the type of instructions in the binary code of a workload to suggest using a particular type of processor for executing the workload. The identified type of processor may be available in some cloud resources and not others. Thus, the static analysis of the embodiment selects or prefers the cloud resources including the identified type of processor to other available cloud resources for executing the workload.

As some more examples, static analysis of a workload may reveal that the workload is cache intensive operations heavy. An embodiment may accordingly recommend placing the workload on a system with larger than a threshold size of L1/L2 cache to achieve better than a threshold performance of the workload execution. Similarly if the static analysis reveals that a workload is floating point operations heavy, an embodiment may recommend scheduling the workload on a cloud resource with suitable support for floating point operations.

The static analysis of an embodiment can further suggest a set of performance parameters of the workload that should be observed during the workload's execution for dynamic analysis described below. As some examples, an embodiment may identify load/store performance, register use factor, or FLOPs, as performance parameters to watch during a workload's execution. Once a suitable cloud resource is identified based on the static analysis, a set of performance parameters to monitor has been determined, or a combination thereof, the execution of the workload can be commenced on the cloud resource such that the various cloud optimization objectives can be satisfied.

While the static analysis of an embodiment provides some insights into the optimal placement of the workload on cloud resources, the runtime behavior of a workload may not be predictable based only on the static analysis. Therefore, an embodiment further provides for monitoring the execution of the workload in a dynamic analysis phase. The dynamic analysis of an embodiment monitors the workload execution on the selected cloud resource using, but not limited to, the performance parameters identified during static analysis. As an example, the dynamic analysis according to an embodiment can use the performance counters available in many data processing systems to determine the utilization of various processor resources, such as the cache, input/output (I/O) buffers, and registers. As another example, the dynamic analysis according to an embodiment can also compute a performance index for the workload's execution to determine whether the cloud resource that is being used to execute the workload is the optimal cloud resource for the execution under the prevailing circumstances in the cloud.

The dynamic analysis according to an embodiment can further suggest another cloud resource to execute the workload if the selected cloud resource is sub-optimal for the workload. For example, based on the runtime characteristics of a workload, and based on the availability of certain cloud resources at the time of the execution, the dynamic analysis of an embodiment can suggest releasing the cloud resource being used for the workload and moving the workload to another available cloud resource, such that either the execution performance of the workload is improved, the cost of executing the workload is reduced, or both. The dynamic analysis according to an embodiment can further instruct a job scheduler to effect the change of cloud resources.

The illustrative embodiments are described with respect to certain computing resources only as examples. Such descriptions are not intended to be limiting on the illustrative embodiments. For example, an illustrative embodiment described with respect to a server or a processor can be implemented with respect to a data storage component, networking component, peripherals, or sub-components thereof within the scope of the illustrative embodiments.

Similarly, the illustrative embodiments are described with respect to certain analysis factors only as examples. Such descriptions are not intended to be limiting on the illustrative embodiments. For example, an illustrative embodiment described with respect to floating point operations can be implemented using I/O throughput information within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application, including an application implementing all or part of an embodiment, may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

An illustrative embodiment may be implemented in hardware, software, or a combination thereof. An illustrative embodiment may further be implemented with respect to any type of cloud computing resource, such as a physical or virtual data processing system or components thereof, that may be available in a given cloud computing environment.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
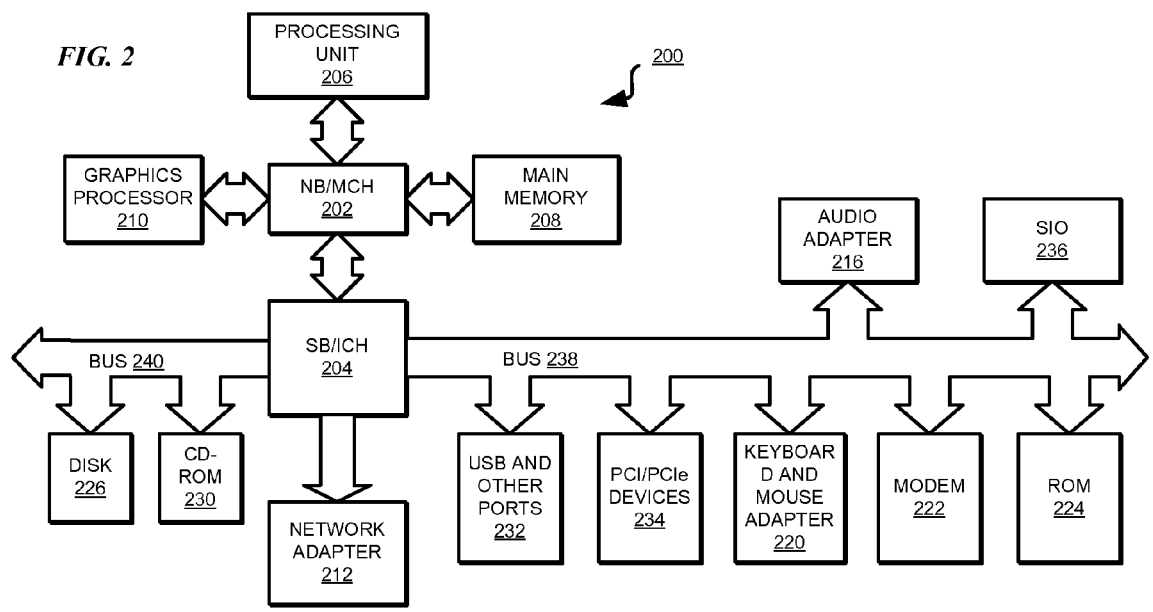
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Some elements depicted in this figure, such as server 104, server 106, storage 108, and part of network 102, may comprise a cloud computing environment (cloud). A data processing system associated with the cloud, such as server 104, may include application 105 executing thereon. Application 105 may be an application for scheduling workloads on cloud resources, configuring cloud resources, and generally managing the cloud resources. Application 105 may be any suitable application in any combination of hardware and software, and may execute on a data processing system within the cloud or outside the cloud. Application 105 may be modified to implement an embodiment of the invention described herein. Alternatively, application 105 may operate in conjunction with another application (not shown) that implements an embodiment.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
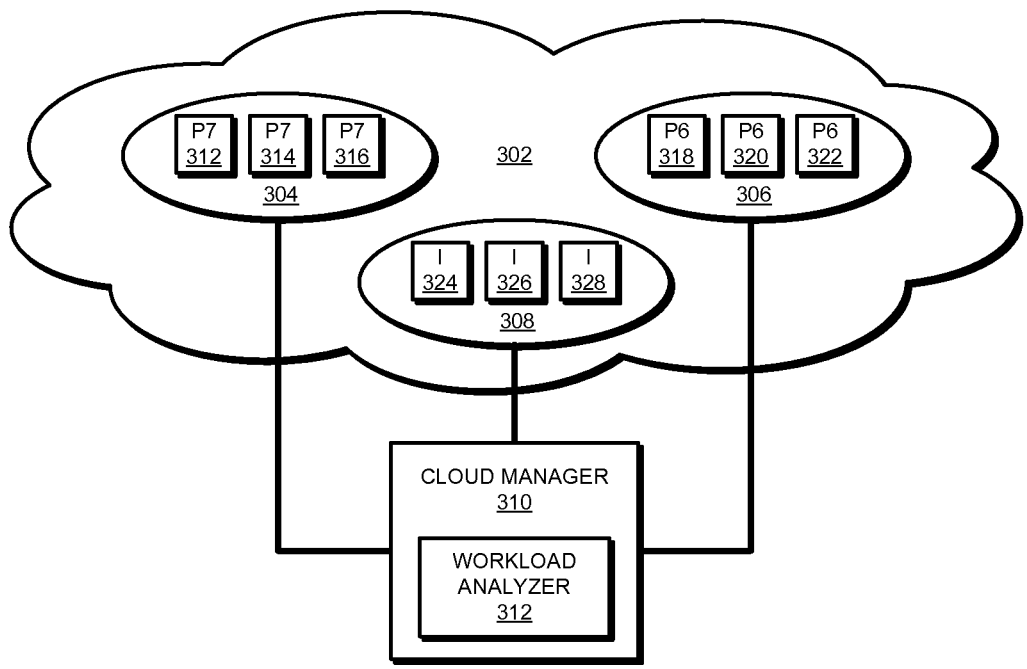
FIG. 3 depicts an example configuration for optimizing a cloud computing environment in accordance with an illustrative embodiment.

With reference to FIG. 3, this figure depicts an example configuration for optimizing a cloud computing environment in accordance with an illustrative embodiment. Cloud 302 includes computing resources that are logically or physically grouped as depicted. For example, group 304 may be a cluster of Power7® architecture based servers; group 306 may be a cluster of Power6® architecture based servers, and group 308 may be a cluster of Intel® processor based servers. (Power6 and Power7 are registered trademarks of IBM Corporation in the United States and in other countries. Intel is a registered trademark of Intel Corporation in the United States and other countries.)

Cloud manager 310 may be a modification of cloud manager 105 in FIG. 1, modified according to an embodiment. In one embodiment, cloud manager 310 includes workload analyzer 312 that embodies one or more workload analysis techniques described herein. Generally within the scope of this disclosure, a component, application, module, or logic described as included in an improved cloud manager may be separate from the cloud manager and operating in conjunction therewith.

Figure 4:
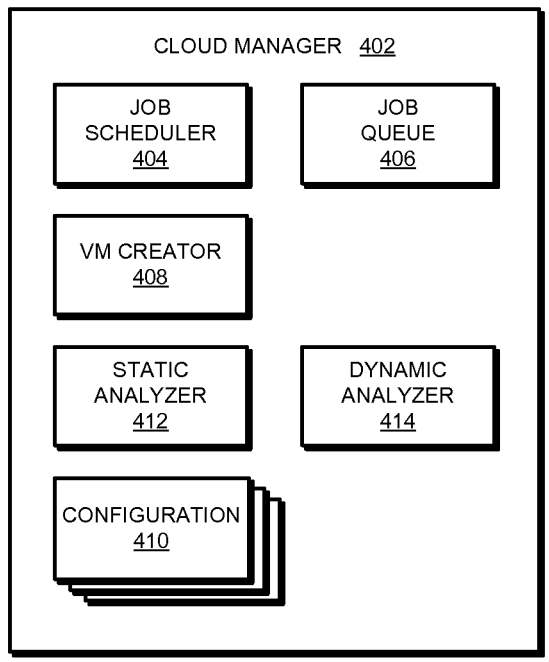
FIG. 4 depicts an improved cloud manager in accordance with an illustrative embodiment.

With reference to FIG. 4, this figure depicts an improved cloud manager in accordance with an illustrative embodiment. Cloud manager 402 may be used as cloud manager 310 in FIG. 3. Some of the logic described with respect to the various artifacts depicted in FIG. 4 can be implemented as workload analyzer 312 in FIG. 3.

Job scheduler 404 is any job scheduling application or module usable by cloud manager 402 for scheduling workloads using cloud resources under cloud manager 402's management. Job queue 406 is any implementation of a queue to which workloads can be submitted for execution in a cloud. Job scheduler 404 typically extracts jobs/workloads from job queue 406 and schedules them for execution.

VM creator 406 is a module that cloud manager 402 can use for creating VMs using cloud resources. For example, for a PaaS client, cloud manager 402 may use VM creator 408 to create a VM suitable for executing the workload of the PaaS client. For an IaaS client, cloud manager 402 may use VM creator 408 to create a VM as specified by the IaaS client.

Configuration 410 is one or more configuration files or other forms of configuration information storage. Configuration 410 stores information about the cloud resources available in the cloud along with the various characteristics of those resources that are usable for selecting appropriate resources for a given workload. In one embodiment, configuration 410 also includes information about the allocation of various resources described therein. In such an embodiment, configuration 410 provides a mechanism to track the allocated resources, and presents a current view of the resources that may be available for allocation at a given time. For example, for a cloud resource described in configuration 410, an embodiment lists the workloads allocated to that resource at a given time.

Static analyzer 412 performs static analysis according to an embodiment on a workload that is to be scheduled by job scheduler 404. Dynamic analyzer 414 performs dynamic analysis according to an embodiment on a workload that is executing in the cloud upon being scheduled by job scheduler 404.

Figure 5:
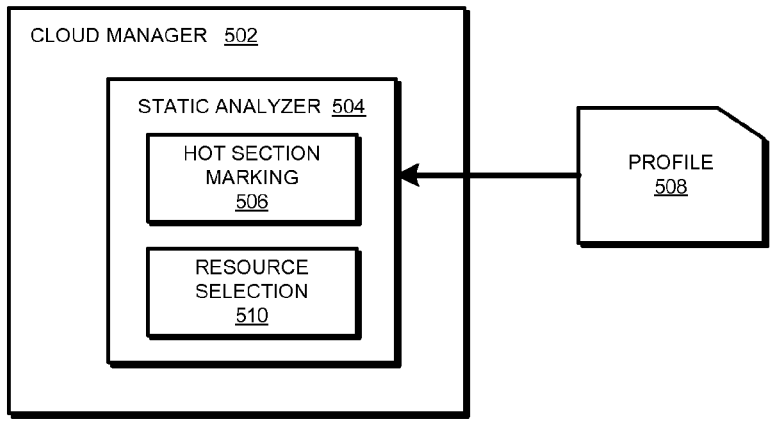
FIG. 5 depicts a block diagram of an example configuration of a static analyzer in accordance with an illustrative embodiment.

With reference to FIG. 5, this figure depicts a block diagram of an example configuration of a static analyzer in accordance with an illustrative embodiment. Cloud manager 502 is analogous to cloud manager 402 in FIG. 4. Static analyzer 504 can be used as static analyzer 412 in FIG. 4.

Static analyzer 504 includes hot section marking module 506. Hot section marking module 506 identifies and marks one or more portions of a workload, such as in the binary code of the workload, that meet a certain static analysis criterion. For example, a particular method or function in the code, which may be I/O intensive, may be called within the code more than a threshold number of times. The method or function can be identified and marked as a hot section of the workload using hot section marking module 506.

In one embodiment, profile 508 may be available to assist with hot section marking using module 506. For example, a compiler may generate profile 508 during the compilation of a workload that is being analyzed by static analyzer 504. Typically, in profile 508, the compiler can identify portions of code bearing certain characteristics, including, but not limited to number of times a method or function is called, as in the previous example.

Similarly, hot section marking module 506, with or without the assistance of profile 508, may identify other static characteristics of a given workload. Some more examples of static characteristics that can be identified during hot section marking using module 506 include identifying the concentration of certain types of instructions above a threshold, whether vector instructions are used, whether instructions of a certain ISA version are present, and concentration of load/store instructions exceeding a threshold in the workload. These examples are only intended to be illustrative and not intended to be limiting on the embodiments. Those of ordinary skill in the art will be able to conceive from this disclosure many other static characteristics of a workload that can be identified and marked in a similar manner, and the same are contemplated within the scope of the illustrative embodiments.

Resource selection module 510 selects suitable cloud resources using which the workload being analyzed should be executed. For example, in one embodiment, after hot section marking is completed, the characteristics obtained from that part of the static analysis is mapped to the available cloud resources and their associated characteristics as available from configuration 410 in FIG. 4. A match, including but not necessarily always the best match, between the static characteristics of the workload and the characteristics of the cloud resources identifies the cloud resource as being suitable for executing the workload. Job scheduler 404 in FIG. 4 can then schedule the workload to execute using those identified cloud resources.

According to another embodiment, another module (not shown) in static analyzer 504 provides a set of performance parameters (hints) that can be monitored by the dynamic analyzer of an embodiment when the workload begins execution using the selected cloud resources. This aspect of an embodiment is described earlier, and will become clearer with the description of an embodiment including dynamic analysis that follows.

Figure 6:
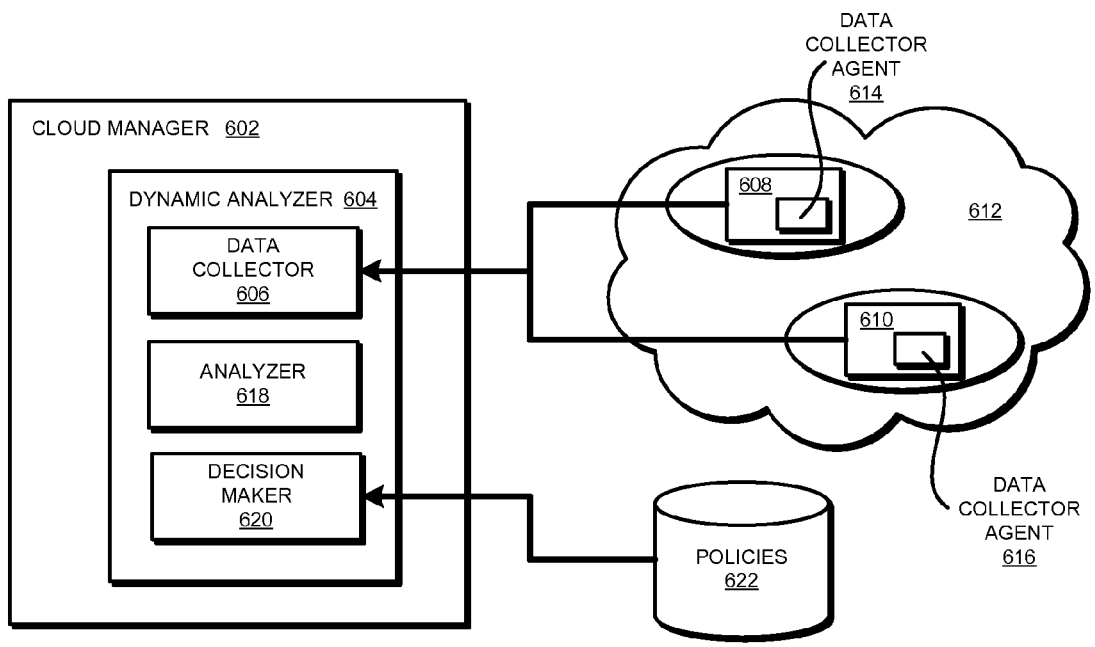
FIG. 6 depicts a block diagram of a configuration of a dynamic analyzer in accordance with an illustrative embodiment.

With reference to FIG. 6, this figure depicts a block diagram of a configuration of a dynamic analyzer in accordance with an illustrative embodiment. Cloud manager 602 is analogous to cloud manager 502 in FIG. 5. Dynamic analyzer 604 can be used as dynamic analyzer 414 in FIG. 4. The operation of dynamic analyzer 604 is described first using an example embodiment, and the components of dynamic analyzer 604 are associated with certain described operations thereafter.

In one embodiment, dynamic analyzer 604 relies on performance counters to gather data when a workload is executing. Using the set of performance parameters from an embodiment of static analyzer described earlier, dynamic analyzer 604 collects performance information from the appropriate counters to determine how well the application utilizes the allocated cloud resources. The performance counters according to such an embodiment can be the performance counters available in presently available processors as well as other performance recording and reporting devices implemented in hardware or software.

Once the workload begins execution, the workload can be monitored for various performance parameters, for example, cache miss, or I/O usage. An embodiment can further create a workload profile (dynamic profile) using with these performance parameters after executing the workload for a stipulated period.

The dynamic profile can then be examined to determine whether the workload has made effective utilization of the allocated cloud resources. For example, such a dynamic profile according to an embodiment can help determine whether the workload utilized a particular cloud resource above a threshold utilization. As an example, if the workload utilizes the resource below the threshold, the cloud resource allocation to the workload can be changed to a different available resource, such as a smaller memory or a slower processor, that can be better utilized for the remainder of the workload execution. On the other hand, if the resource provided is utilized below the threshold level of utilization (under-utilized, sub-optimal), or is a mismatch than what is needed by the workload, a different, more suitable resource can similarly be replaced for the remainder of the workload's execution.

Data collector module 606 is usable for collecting the resource usage data from the cloud resources allocated to execute a given workload. As an example, assume that servers 608 and 610 are cloud resources allocated to execute a workload in cloud 612. Data collector agent 614 and 616 execute in servers 608 and 610 respectively. Any number of data collector agents can be similarly utilized within the scope of the illustrative embodiments.

Data collector agents 614 and 616 collect and transfer the performance parameters (as identified by an embodiment of static analyzer 504 in FIG. 5, and monitored by an embodiment of dynamic analyzer 604), including resource utilization data, while the workload executes on servers 608 and 610. Data collector agents 614 and 616 send the performance parameters to data Collector module 606. Data collector module 606 of an embodiment can be configured collect various fine-grained data including but not limited to various micro-architecture events of the microprocessor. For example, data collector module 606 can similarly collect the functional unit details, the number and type of instruction executed in each processor, the performance index of various processor cores allocated to a given workload. As some more examples, data collector agents 614 and 616 can similarly collect data including flushes, cache misses, or load/store reorder queue misses, and report to data collector module 606.

These and other similarly collected performance data can be helpful in determining the utilization levels and performance of the cloud resources allocated to the workload. For example, a processor includes numerous functional/execution units, such as a fixed point unit, a floating point unit, a vector unit, a decimal floating point unit, a load/store unit, and a branch unit. Collecting performance and utilization data on the unit level in a processor resource can make the decision making process, for keeping the allocation or moving the workload to another resource, finer grained and realistically reflective of the workload execution.

Analyzer module 618 is usable for analyzing the data collected by data collector module 606. In an embodiment, analyzer module 618 calculates various decision making factors, such as utilization or performance of a particular resource allocated to a particular workload during a particular time. Analyzer module 618 supplies such decision making factors to decision making module 620.

Decision maker module 620 uses the information from analyzer module 618 together with optimization algorithm or policy from repository 622 to determine whether to allow a workload to continue executing using the allocated cloud resource or move the workload to a different cloud resource. For example, decision maker module 620 may allows a workload to continue executing using the allocated resource if the workload's usage of the resource exceeds a threshold.

In an embodiment, decision maker module 620 performs the trade-off decisions between seeking better utilization of cloud resources, faster completion of the workload, accommodating higher number of workloads, and other cloud performance considerations. For example, an embodiment of decision maker module 620 considers incoming or pending workloads from a job queue 406 in FIG. 4, the utilization levels of various types of cloud resources configuration 410 and scheduler 404 in FIG. 4, and suitability of workloads to the allocated resources from data received from analyzer 618.

Figure 7:
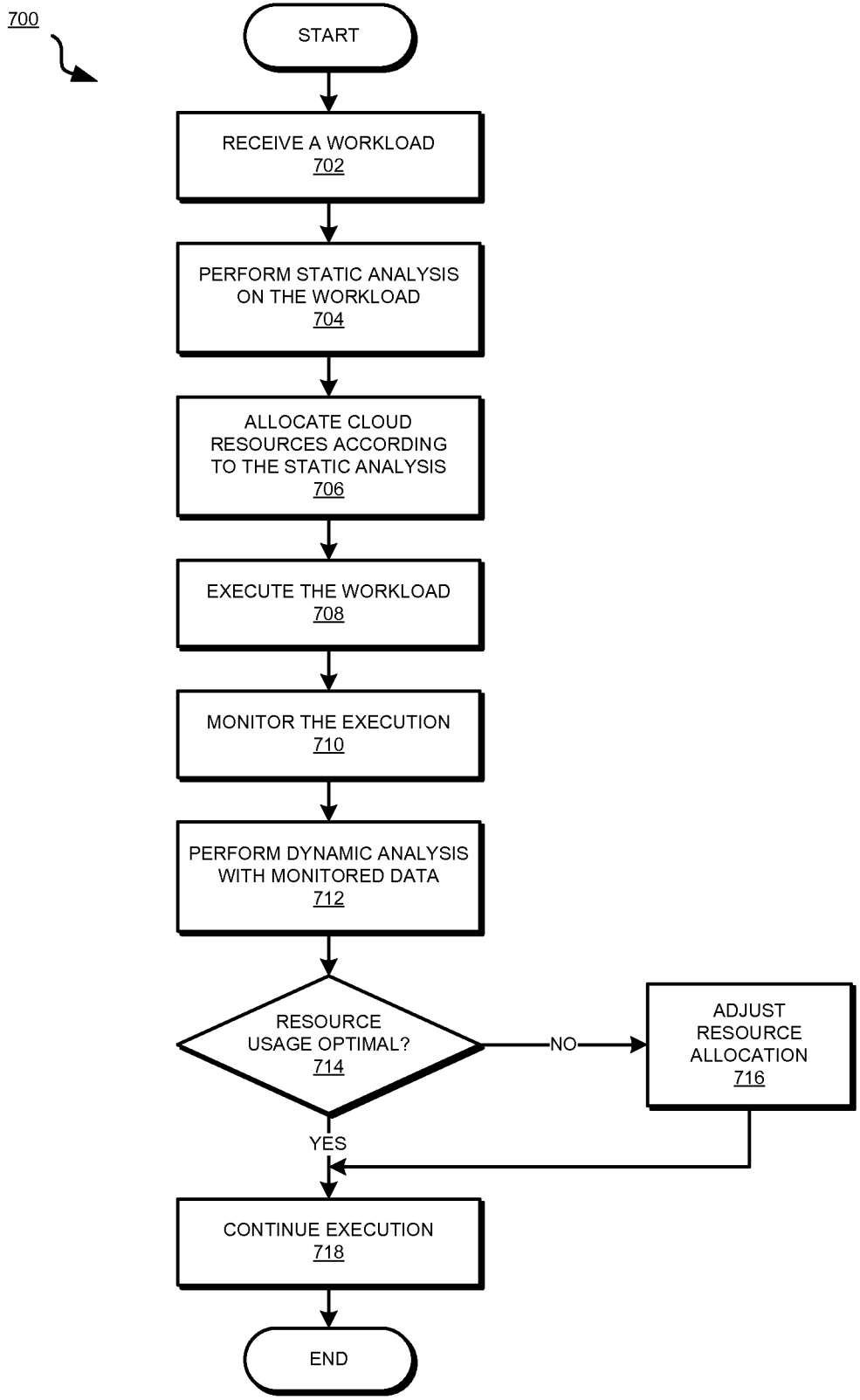
FIG. 7 depicts a flowchart of an example process of cloud optimization using workload analysis in accordance with an illustrative embodiment.

With reference to FIG. 7, this figure depicts a flowchart of an example process of cloud optimization using workload analysis in accordance with an illustrative embodiment. Process 700 can be implemented in a workload analyzer, such as in workload analyzer 312 in FIG. 3, which can be configured to include static analyzer 504 in FIG. 5 and dynamic analyzer 604 in FIG. 6.

Process 700 begins by receiving a workload, such as from a job queue (step 702). Process 700 performs a static analysis on the workload, such as by using static analyzer 504 in FIG. 5 (step 704). Process 700 allocates cloud resources to the workload according to the static analysis (step 706). Process 700 sends the workload for execution, such as by informing a job scheduler to schedule the workload (step 708).

Process 700 monitors the execution of the workload, such as by using dynamic analyzer 604 and data collector agent 614 in FIG. 6 (step 710). Process 700 performs dynamic analysis of the executing workload with the monitored data (step 712).

Process 700 determines whether the usage of the allocated cloud resources by the workload is optimal (step 714). If the resource usage is not optimal ("No" path of step 714), process 700 decides, such as by using decision maker module 620 in FIG. 6, to adjust the resource allocation to the workload (step 716). Process 700 then proceeds to step 718.

If the resource usage is optimal, such as, for example, the resource usage exceeds a threshold, ("Yes" path of step 714), process 700 continues the execution of the workload using the allocated resources (step 718). Following step 716, process 700 continues the execution of the workload using the adjusted resources in step 718. Process 700 ends thereafter.

Figure 8:
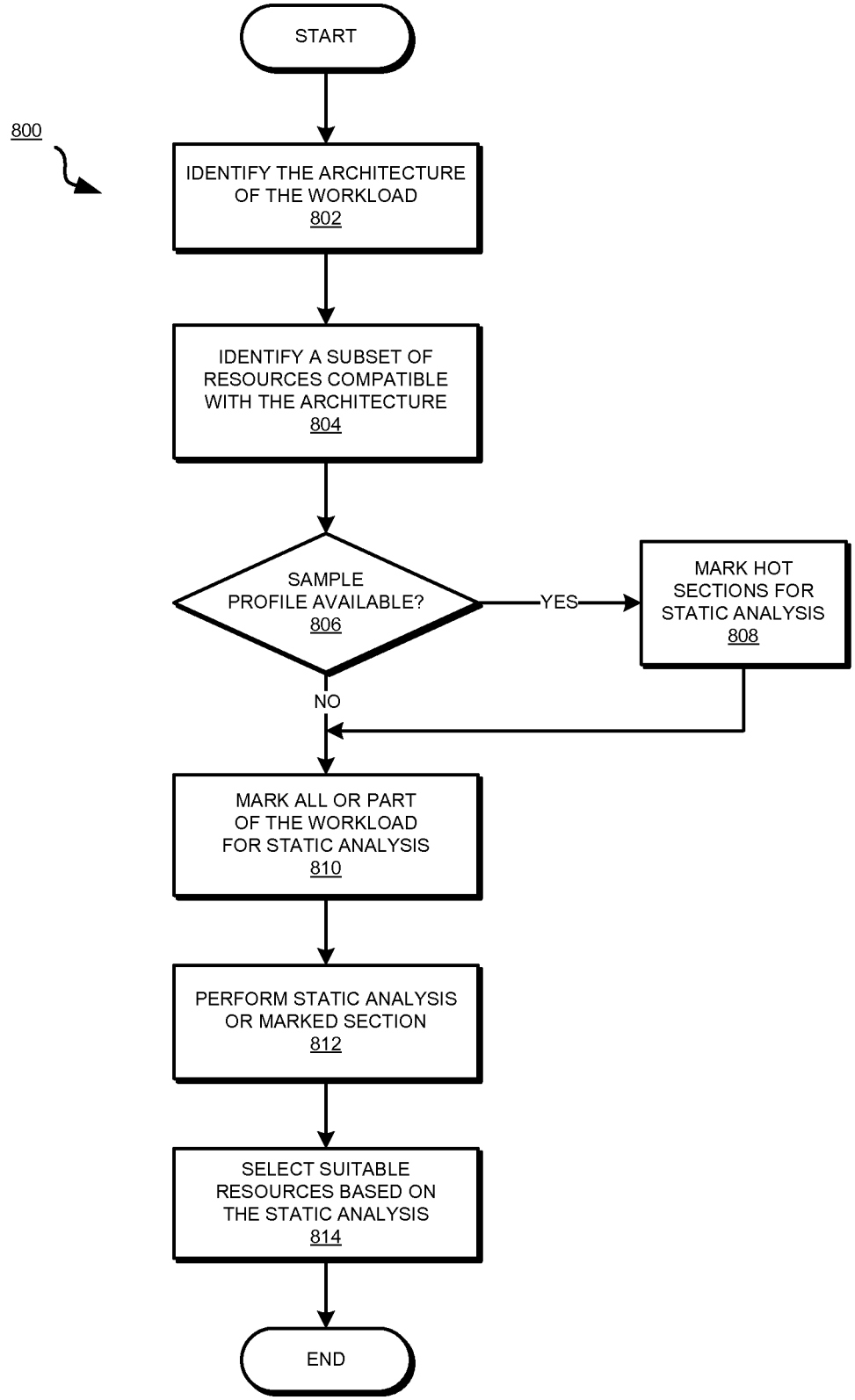
FIG. 8 depicts a flowchart of an example process of static analysis of a workload in accordance with an illustrative embodiment.

With reference to FIG. 8, this figure depicts a flowchart of an example process of static analysis of a workload in accordance with an illustrative embodiment. Process 800 can be implemented in a static analyzer, such as static analyzer 504 in FIG. 5.

Process 800 begins by identifying the architecture of the workload, such as an instruction set architecture of the binary code of the workload (step 802). Process 800 identifies a subset of the available cloud resources compatible with the architecture (step 804).

Process 800 determines whether a sample profile, such as from a compiler, is available for the workload (step 806). If a sample profile is available ("Yes" path of step 806), process 800 marks hot sections of the workload for the static analysis (step 808).

If a sample profile is not available ("No" path of step 806), process 800 may mark all or part of the workload for static analysis based on other criteria (step 810). For example, in one embodiment, process 800 may identify and mark only the I/O sections of a workload for static analysis.

Process 800 performs static analysis on the marked section (s) (step 812). Process 800 selects suitable resources based on the static analysis (step 814). Process 800 ends thereafter.

Figure 9:
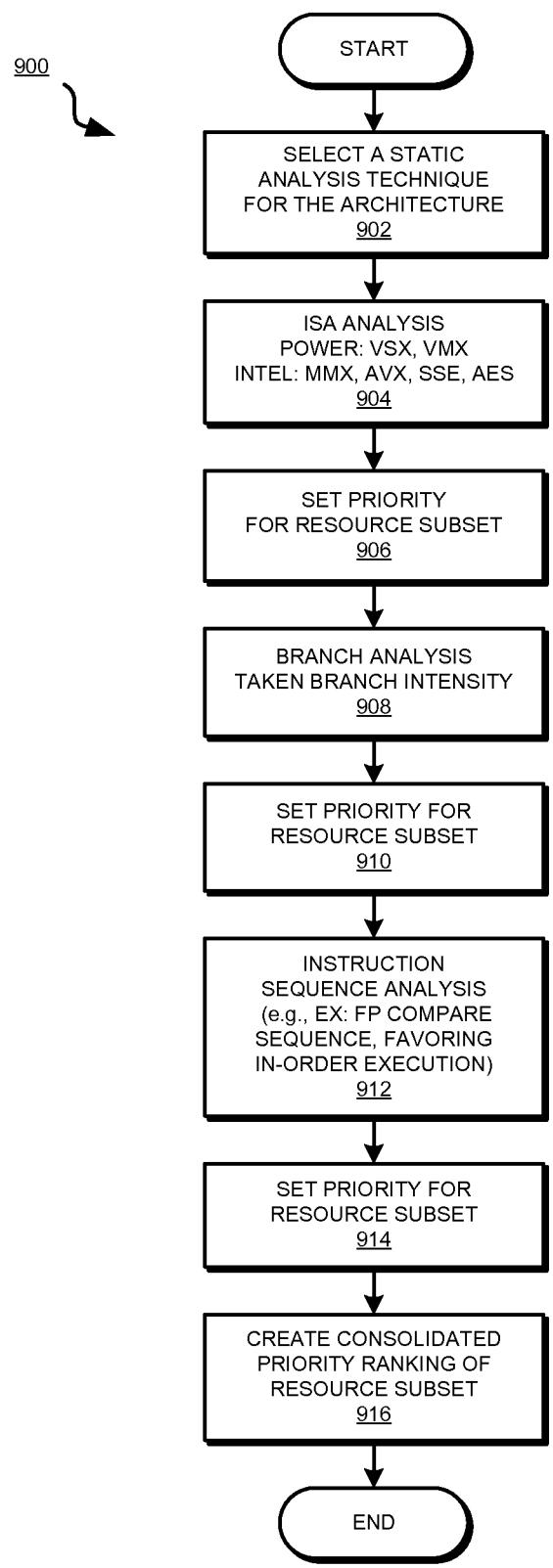
FIG. 9 depicts a flowchart of an example static analysis in accordance with an illustrative embodiment.

With reference to FIG. 9, this figure depicts a flowchart of an example static analysis in accordance with an illustrative embodiment. Process 900 may be implemented in static analyzer 504 in FIG. 5.

Process 900 begins by selecting one or more particular static analysis technique for the architecture of a given workload (step 902). For example, process 900 may select ISA analysis of the workload to determine suitability of Power6, Power7, or various Intel processor based cloud resources for executing the workload (step 904). Process 900 selects and prioritizes the available resources based on the findings of step 904 (step 906). For example, executing the workload may be possible on both Power7 and Power6 architectures, but may be more desirable on a Power7 architecture based system.

Process 900 may have selected additional static analysis techniques in step 902. For example, process 900 may also execute a branch analysis on the workload to determine the taken-branch intensity (step 908). Again, process 900 selects and prioritizes the available resources based on the findings of step 908 (step 910). In one embodiment, the selecting and prioritizing of step 910 may further reduce the set of resources selected and prioritized in step 904. In another embodiment, the set of step 910 may be determined independently of the set of step 904.

Process 900 may have selected any number of static analysis techniques in step 902. For example, process 900 may also execute an instruction sequence analysis on the workload to determine FP compare sequence or in-order execution requirements (step 912). Again, process 900 selects and prioritizes the available resources based on the findings of step 912 (step 914). In one embodiment, the selecting and prioritizing of step 914 may further reduce the set of resources selected and prioritized in steps 904 and 910. In another embodiment, the set of step 914 may be determined independently of the set of steps 904 and 910.

Regardless of how many static analysis techniques are employed in process 900, process 900 eventually creates a consolidated priority ranking of the cloud resources selected and prioritized through the process (step 916). Process 900 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for cloud optimization using workload analysis. Using an embodiment of the invention, the allocation of cloud resources to workloads in PaaS as well as IaaS model of cloud services can be improved. Using an embodiment, the performance of the cloud as a whole, or of certain cloud resources in particular, can be improved while delivering user-satisfaction, and achieving cloud-vendor desired performance efficiencies.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can contain, or store a program for use by or in connection with an instruction execution system, apparatus, or device.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for cloud optimization using workload analysis, the method comprising:
   identifying, using a processor and a memory, an architecture of a workload received for execution in a cloud computing environment, the cloud computing environment including a set of cloud computing resources;
   identifying and marking a section of the workload for static analysis;
   performing static analysis on the section to determine a characteristic of instructions in the workload, wherein the characteristic of the instructions is discernible from the workload without executing the workload, wherein the characteristic of the instructions is indicative of a type of resource to use for executing the instructions, wherein the characteristic of the instructions in the workload is indicative of floating point intensive operations being present in the workload, wherein, responsive to the cache floating point intensive operations being present in the workload, the selecting selects a system as a part of the subset of the set of cloud computing resources, and wherein the system includes a level of support for floating point operations for executing the instructions;
   selecting a subset of the set of cloud computing resources, such that a cloud computing resource in the subset is available for allocating to the workload and has a characteristic that matches the characteristic of the instructions in the workload as determined from the static analysis; and
   suggesting the subset of cloud computing resources to a job scheduler for scheduling the workload for execution.

2. The method of claim 1, further comprising:
   executing the workload using a resource from the subset;
   collecting data of a performance parameter at the resource during a portion of the execution of the workload;
   performing dynamic analysis of the workload using the data;
   determining, using a result of the dynamic analysis, whether to allocate a second resource from the set of resources for a remaining portion of the execution;
   adjusting, responsive to the determining being affirmative, a resource allocation to the workload by deallocating the resource from the subset and allocating the second resource to the workload; and
   continuing the execution of the workload using the second resource.

3. The method of claim 1, further comprising:
   suggesting, as a result of the static analysis, a set of performance parameters to monitor during the execution of the workload.

4. The method of claim 1, further comprising:
   receiving a sample profile for the workload, wherein the sample profile is used to identify a hot section in the workload, the hot section forming the section marked for static analysis.

5. The method of claim 1, further comprising:
   identifying a set of static analysis techniques for performing the static analysis;
   selecting a first subset of cloud computing resources from the set of cloud computing resources such that a resource in the first subset has a characteristic that matches a first characteristic of the workload as determined from a first static analysis technique in the set of static analysis techniques;
   selecting a second subset of cloud computing resources from the set of cloud computing resources such that a resource in the second subset has a characteristic that matches a second characteristic of the workload as determined from a second static analysis technique in the set of static analysis techniques; and
   creating a consolidated prioritized ranking of resources in the first and the second subsets for executing the workload.

6. The method of claim 5, wherein the consolidating comprises:
   determining a third subset of cloud computing resources, the third subset forming an intersection of the first and the second subsets.

7. The method of claim 5, wherein the consolidating comprises:
   determining the second subset such that the second subset is a subset of the first subset.

8. The method of claim 1, wherein the section is the entire workload.

9. The method of claim 1, wherein the section is identified in a binary code of the workload.

10. The method of claim 1, further comprising:
    receiving the workload from a job queue in the cloud computing environment.

11. The method of claim 1, wherein the characteristic of the instructions in the workload comprises an instruction set architecture (ISA) used in the workload.

12. The method of claim 1, wherein the characteristic of the instructions in the workload comprises a level of complexity of branch prediction in the instructions in the workload.

13. The method of claim 1, wherein the instructions are instruction in binary code of the workload, wherein the characteristic of the instructions in the workload comprises a type of the instructions in the binary code of the workload, and wherein, responsive to a presence of the type, the selecting selects a particular type of processor as a part of the subset of the set of cloud computing resources to execute the instructions.

14. The method of claim 1, wherein the characteristic of the instructions in the workload is indicative of a cache intensive nature of the workload, wherein, responsive to the cache intensive nature of the workload, the selecting selects a system as a part of the subset of the set of cloud computing resources, wherein the system includes a larger than a threshold size of cache for executing the instructions.

\* \* \* \* \*